(12) United States Patent
Paul

(10) Patent No.: US 7,745,533 B2
(45) Date of Patent: Jun. 29, 2010

(54) MANUFACTURE OF STABLE LOW PARTICLE SIZE ORGANOPOLYSILOXANE EMULSION

(75) Inventor: Amit Kumar Paul, Kolkata (IN)

(73) Assignee: Wacker Chemie AG, Munich (DE)

( * ) Notice: Subject to any disclaimer, the term of this patent is extended or adjusted under 35 U.S.C. 154(b) by 388 days.

(21) Appl. No.: 11/832,278

(22) Filed: Aug. 1, 2007

(65) Prior Publication Data

US 2007/0276087 A1 Nov. 29, 2007

Related U.S. Application Data

(63) Continuation of application No. PCT/EP2006/000690, filed on Jan. 26, 2006.

(30) Foreign Application Priority Data

Feb. 2, 2005 (IN) .............................. 63/KOL/2005

(51) Int. Cl.
   *C08G 77/06* (2006.01)
(52) U.S. Cl. ...................... 524/837; 524/588
(58) Field of Classification Search ................. 524/588, 524/837
   See application file for complete search history.

(56) References Cited

U.S. PATENT DOCUMENTS

| | | |
|---|---|---|
| 3,360,491 A | 12/1967 | Axon |
| 3,697,469 A | 10/1972 | Ikoma et al. |
| 4,228,054 A | 10/1980 | Ona et al. |
| 5,726,270 A | 3/1998 | Craig |
| 5,817,714 A | 10/1998 | Graiver et al. |
| 5,895,794 A | 4/1999 | Berg et al. |
| 5,925,469 A | 7/1999 | Gee |
| 5,998,537 A | 12/1999 | Good et al. |
| 6,071,975 A | 6/2000 | Halloran |
| 6,245,852 B1 | 6/2001 | Hasegawa et al. |
| 2003/0143176 A1 | 7/2003 | Liu et al. |

FOREIGN PATENT DOCUMENTS

| | | |
|---|---|---|
| EP | 0 755 956 A2 | 1/1997 |
| JP | 34-2041 | 1/1956 |

OTHER PUBLICATIONS

English Abstract corresponding to JP 34-2041.

*Primary Examiner*—Edward J Cain
(74) *Attorney, Agent, or Firm*—Brooks Kushman P.C.

(57) ABSTRACT

Stable high viscosity organopolysiloxane emulsions with particle sizes up to 150 nanometer may be made in a simple and cost-effective manner employing a standard homogenizer, and optional subsequent polymerization of the organopolysiloxan at controlled temperature. A combination of non-ionic emulsifier together with an at least one anionic emulsifier is employed, having an HLB value 12-15, while maintaining a temperature up to 50° C.

12 Claims, No Drawings

MANUFACTURE OF STABLE LOW PARTICLE SIZE ORGANOPOLYSILOXANE EMULSION

CROSS-REFERENCE TO RELATED APPLICATIONS

This application is a continuation of PCT Appln. No. PCT/EP2006/000690 filed Jan. 26, 2006 which claims priority to Indian application 63/KOL/2005 filed Feb. 2, 2005.

BACKGROUND OF THE INVENTION

1. Field of the Invention

The present invention relates to a process for making stable, high-viscosity organopolysiloxane emulsions and to an emulsion-polymerization process involving a simple, cost-effective, and faster organopolysiloxane emulsification and also subsequent organopolysiloxane polymerization. The process is directed to be simple and cost-effective and can be easily adapted for emulsion production of stable organopolysiloxane emulsions for diverse and beneficial end use applications. Importantly, the silicone emulsion produced by the process of the invention has average particle sizes (i.e. D50 value) in the range of up to 150 nanometers with a very narrow particle size distribution, and is highly stable and found to have advantageous, beneficial diverse uses in various end applications including personal care, textiles, rubber, paper, and other similar applications/uses.

2. Description of the Related Art

It is well known to provide organopolysiloxane emulsions of varying particle size to suit different end applications. Organopolysiloxane emulsions having small particle sizes prepared by an emulsion-polymerization process are generally preferred, which could provide a desired faster and simpler production, with a focus on emulsion stability and quicker organopolysiloxane polymerization during emulsification. Emulsion-polymerized products are known to be prepared by various methods. For example, JP-B 34-2041 discloses a polymerization process wherein a strong acid and strong base are used as a polymerization catalyst. U.S. Pat. No. 3,697,469 discloses ion-exchange resins as polymerization catalysts. U.S. Pat. Nos. 3,360,491; 3,697,469; 4,228,054; 5,726,270; 5,817,714; 5,895,794; 5,925,469; and 6,071,975 disclose polymerization using alkyl benzene sulphonic acid, alkyl naphthalene sulphonic acid, aliphatic sulphonic acid, silylalkyl sulphonic acid, aliphatically substituted diphenyl ether sulfonic acid or alkyl hydrogen sulphates as a catalyst. However, all these processes take longer time for polymerization and completion of the emulsion-making process. Most of the processes are also restricted only to cyclosiloxanes.

U.S. Pat. No. 6,245,852 discloses a process for preparation of organopolysiloxane emulsions having improved stability over a short time. The process comprises the steps of emulsifying and dispersing low molecular weight organopolysiloxane in water in the presence of at least one anionic surfactant selected from organic sulphonic acid and organic sulphates by using a high pressure homogenizer with a operating pressure range from 700 to 3,000 Kg/cm$^2$ producing an initial emulsion having particle sizes of up to 300 nm, followed by allowing the emulsion to polymerize and subsequently neutralizing the emulsion.

As is clearly apparent from the disclosure in U.S. Pat. No. '852, the process necessarily involves the use of a very sophisticated and highly capital-intensive machine system for reduction of emulsion time in the emulsion polymerization process. Also, since the process uses a high-pressure system, the emulsion machine needs a complex control system for working safely in the production area.

Thus, while the process according to U.S. Pat. No. '852 is stated to reduce the time of emulsification by using a sophisticated high pressure homogenizer, the process does not seem to address the requirement for faster completion of the total emulsion process, including faster polymerization. An emulsion polymerization process usually consists of emulsification of organopolysiloxane and subsequent polymerization of the organopolysiloxane. Thus, faster emulsification on its own is not sufficient to complete an emulsion-polymerization process or make the process faster. Therefore, it is also important to make polymerization faster in emulsion-polymerization processes.

The above state of the art reveals the need to develop processes of making faster the total emulsion-polymerization process. Also, the reduction in the particle size which is found to be of relevance for a variety of end use/applications involving a faster emulsion-polymerization process is desirable for wide-scale commercial manufacturing and use of such emulsions for diverse applications.

SUMMARY OF THE INVENTION

It is thus a basic object of the invention to provide a process of making silicone emulsions having particle sizes up to 150 nm, which would, on one hand, be simple, cost-effective. and fast, and on the other hand, would provide a simple and cost-effective alternative to the need for complex machinery for faster emulsification and also reduce the polymerization time in the emulsion-polymerization process. The process can thus be readily adapted for large-scale, cost-effective commercial manufacture of such small particle size silicone emulsions for diverse applications such as personal care and the like.

Another object of the invention is directed to provide a simple process for making silicone emulsions having particle sizes up to 150 nanometers, which would significantly reduce the total "emulsion polymerization time".

Another object of the present invention is directed to a process for the manufacture of silicone emulsions having particle sizes of up to 150 nanometers which would assist faster polymer growth of the organopolysiloxane during emulsion process.

Yet a further object of the present invention is directed to making stable silicone emulsions having particle sizes up to 150 nanometers employing a standard homogenizer by way of a selective emulsion formulation and avoiding the need for complex machinery to reduce the emulsification and polymerization stages in such manufacture of silicone emulsion.

DETAILED DESCRIPTION OF THE PREFERRED EMBODIMENTS

Thus, according to a basic aspect of the present invention, there is provided a process for the manufacture of a stable emulsion having particle sizes up to 150 nanometers comprising:

i) providing a selective formulation comprising (a) organopolysiloxane or mixtures thereof in an amount of 20 to 80% by wt. (b) water in an amount of 5 to 30% by wt. (c) selective non-ionic emulsifier(s) having an HLB in the range of 10-19 in amounts of 1 to 25% by wt. and (d) selective anionic emulsifier(s) having an HLB in the range of 8-19 in an amount of 1 to 15% by wt.;

ii) homogenizing the mix of (i) using a standard homogenizer and maintaining a temperature of up to 50° C., preferably in the range of 10-40° C., such as to favor organopolysiloxane polymer growth rate or rise in polymer viscosity to at least 20,000 cp; and iii) neutralizing the emulsion by alkali to a pH range 6-8.

Importantly, it is found by way of the invention that one of the critical aspects which enable obtaining an emulsion of up to 150 nanometers particle size by a simple process is the selective use of a combination of non-ionic emulsifier together with at least one anionic emulsifier to achieve the desired particle size emulsion. For organopolysiloxane emulsions, an HLB value near the range of 12-15 is found to be the optimum value of the emulsifier or a mixture of emulsifiers, which help to make small particle emulsions. It is also found that a mixture of non-ionic and anionic emulsifiers having an HLB value near the range of 12-15 is optimum for making small particle size, stable emulsions with a standard homogenizer.

Also, the quantity of the emulsifiers used in the above selective formulation have selective contribution to make the emulsion stable. In particular, in the above process of making small particle organopolysiloxane emulsions, the emulsion is also stabilized by use of surfactants having critical HLB values that help to make faster small particle emulsions by using a standard homogenizer without need for a complex ultra-high-pressure homogenizer.

Moreover, it is also important to control the temperature for achieving small particle sizes with narrow particle size distribution. Advantageously, preparing the emulsion with a temperature up to 50° C. is found to facilitate faster polymer growth of organopolysiloxane in the emulsion. Temperature during the emulsion preparation is found to have great importance, not only to control the particle size, but also to control the particle size distribution and faster growth of internal phase viscosity.

In the above process of the invention, preferably, a suitable biocide is added for preventing microbial growth.

Since the process uses a mixture of surfactants for making small particle size organopolysiloxane emulsions by using standard homogenizers, it is important to maintain the selective formulation involving making a proper amount of surfactants and proportion of organopolisiloxanes and surfactants to achieve particle sizes up to 150 nanometers.

In accordance with a preferred aspect of the above process for the manufacture and faster production of stable small particle-size emulsions having high internal phase oil viscosity, the method comprises:

(i) providing a selective formulation comprising water in an amount of 5 to 30% of the emulsion, 8 to 30% mixed emulsifiers comprising at least one anionic emulsifier and at least one non-ionic emulsifier having an HLB value in the range of 10-19, and an organopolysiloxane or mixture of organopolysiloxanes in the range of 20-80% of the emulsion.

(ii) homogenizing the mixture with a standard homogenizer while maintaining a temperature in a range up to 50° C., preferably in the range of 20-40° C., for a time period of 10 minutes to 2 hours depending on the desired characteristics of the emulsion;

(iii) allowing the emulsion to age in the range of 30° C. to facilitate faster increase in the viscosity of the internal phase oil;

(iv) neutralizing the emulsion with alkali and finally, optionally adding biocide for microbial prevention in the emulsion.

The temperature of the material can be controlled during homogenizing by cooling with water. In the above process, the desired aging temperature for growth of very high internal oil viscosity is in the range of 5 to 30° C. Generally, 1 to 12 hours is required to achieve a very high internal phase oil. If internal oil viscosity is needed to be less than 500,000 cp, then neutralizing of the emulsion is carried out immediately after completion of mixing. Moreover, it is found that desired mixing time also varies for target viscosity of the polymer and distribution of the particles in the emulsion.

The emulsion is neutralized after completion of dilution steps. Generally, water-soluble inorganic alkali hydroxide or organic alkanolamine is used for neutralization. Preferably, sodium hydroxide or potassium hydroxide or triethanolamine is used to neutralize the emulsion.

According to the present invention, one of the critical parameters includes the selection of the right emulsifiers and combination of the emulsifiers to achieve the desired small particle size emulsion. The present invention thus achieves producing small particle emulsions in a simple way where selective emulsifier combinations and the temperature of emulsification and polymerization play a critical role in making the process simple and avoiding the use of expensive and complex machinery.

The invention thus provides a process for making stable small particle emulsion from a low molecular weight organopolysiloxane or a mixture of organopolysiloxanes. Organopolysiloxanes referred to herein for the purpose of the invention include low molecular weight organopolysiloxanes such as alpha omega-hydroxy terminated organopolysiloxanes; alpha, omega-alkoxy terminated organopolysiloxanes; organocyclopolysiloxanes; or a mixture thereof.

In the case of branched polysiloxane emulsions a tri-functional or tetra-functional silane or a mixture thereof is used together with above organopolysiloxanes.

The alpha, omega-functional end blocked linear organopolysiloxanes used herein are preferably those of the general formula I:

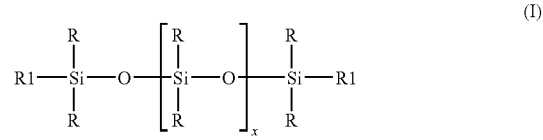

(I)

Where R1 is hydrogen and/or a monovalent hydrocarbon group of 1 to 10 carbon atoms and/or a hydroxyl group and/or an alkoxy group having 1 to 8 carbon atoms. Examples of R1 as a monovalent hydrocarbon group are methyl, ethyl, n-propyl, isopropyl, n-butyl, isobutyl, tert-butyl, n-pentyl, isopentyl, neopentyl, tertpentyl, hexyl such as n-hexyl, heptyl such as n-heptyl, octyl such as n-octyl and isooctyl such as 2,2,4-trimethyl-pentyl, nonyl such as n-nonyl, decyl such as n-decyl, dodecyl such as n-dodecyl, octadecyl such as n-octadecyl; alkenyl such as vinyl and allyl; cycloalkyl such as cyclopentyl, cyclohexyl, cycloheptyl and methyl cyclohexyl; aryl such as phenyl, naphthyl, anthryl and phenanthryl; alkylaryl such as o-, m-, p-tolyl, xylyl and ethylphenyl; such as benzyl, and α- and β-phenylethyl; of which methyl, ethyl, n-propyl, and isopropyl are preferred, and methyl is particularly preferred. Examples of R1 as an alkoxy group are methoxy, ethoxy, propoxy, butoxy, pentoxy, hexoxy or phenoxy, but are not limited to these groups.

Where R, which may differ, is a monovalent hydrocarbon radical. Examples of R are alkyl radicals such as methyl, ethyl, n-propyl, isopropyl, n-butyl, isobutyl, tertbutyl, n-pentyl, isopentyl, neopentyl, tertpentyl, hexyl such as n-hexyl, heptyl, such as n-heptyl, octyl such as n-octyl and isooctyl such as 2,2,4-trimethylpentyl, nonyl such as n-nonyl, decyl such as n-decyl, dodecyl such as n-dodecyl, octadecyl such as n-octadecyl; alkenyl such as vinyl and allyl; cycloalkyl such as cyclopentyl, cyclohexyl, cycloheptyl and methyl cyclohexyl; aryl such as phenyl, naphthyl, anthryl and phenanthryl; alkylaryl such as o-, m-, p-tolyl, xylyl and ethylphenyl; aralkyl, such as benzyl, and α- and β-phenylethyl; of which methyl, ethyl, n-propyl, and isopropyl are preferred, and methyl is particularly preferred.

x is an integer from 1 to 100.

The organocyclosiloxanes used herein have the following structure:

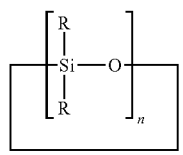
(II)

Where R is the independently hydrogen or monovalent hydrocaqrbon groups of 3 to 10 carbon atoms including an alkyl group such methyl, ethyl, n-propyl, isopropyl, n-butyl, isobutyl, tert-butyl, n-pentyl, isopentyl, neopentyl, tert-pentyl, hexyl such as n-hexyl, heptyl such as n-heptyl, octyl such as n-octyl and isooctyl such as 2,2,4-trimethylpentyl, nonyl such as n-nonyl, decyl such as n-decyl, dodecyl such as n-dodecyl, octadecyl such as n-octadecyl; alkenyl such as vinyl and allyl; cycloalkyl such as cyclopentyl, cyclohexyl, cycloheptyl and methyl cyclohexyl; aryl such as phenyl, naphthyl, anthryl and phenanthryl; alkylaryl such as o-, m-, p-tolyl, xylyl and ethylphenyl; aralkyl such as benzyl, and α- and β-phenylethyl; of which methyl, ethyl, n-propyl, and isopropyl are preferred, and methyl is particularly preferred. 'n' is an integer from 3 to 10. The most preferred organocyclosiloxanes are octamethylcyclotetrasiloxane; decamethylcyclopentasiloxane; dodecamethyl cyclohexasiloxane; 1,2,3,4-tetramethyl-1,2,3,4-tetravinyl cyclotetrasiloxane; and 1,2,3,4-tetramethyl-1,2,3,4-tetraphenyl cyclotetrasiloxane.

Organopolysiloxanes used according to the present invention may be branched by way of incorporation of branching units. Branching units may be introduced to improve the film forming behavior of organopolysiloxane. Branching units may comprise a trifunctional silane or tetrafunctional silane or a mixture thereof. Trifunctional silanes (III) and tetrafunctional silanes (IV) have the following structure:

R—Si—(O—R)$_3$          (III)

Si—(O—R)$_4$          (IV)

Where R, which may differ, is a monovalent hydrocarbon radical. Examples of R are alkyl radicals such as methyl, ethyl, n-propyl, isopropyl, n-butyl, isobutyl, tert-butyl, n-pentyl, isopentyl, neopentyl, tert-pentyl, hexyl such as n-hexyl, heptyl such as n-heptyl, octyl such as n-octyl and isooctyl such as 2,2,4-trimethylpentyl, nonyl such as n-nonyl, decyl such as n-decyl, dodecyl such as n-dodecyl, octadecyl such as n-octadecyl; alkenyl such as vinyl and allyl; cycloalkyl such as cyclopentyl, cyclohexyl, cycloheptyl and methyl cyclohexyl; aryl such as phenyl, naphthyl, anthryl and phenanthryl; alkylaryl such as o-, m-, p-tolyl, xylyl and ethylphenyl; aralkyl, such as benzyl, and α- and β-phenylethyl; of which methyl, ethyl, n-propyl, and isopropyl are preferred, and methyl is particularly preferred. Depending on the desired requirement of branching of the organopolysiloxane, branching units are added during the emulsification process. 0.1 to 5% branching units of the emulsion are useful to make an emulsion containing organopolysiloxane having a highly branched structure. The quantity used in the emulsion must be controlled carefully, otherwise gellation of the polymer may occur during the emulsion process and the emulsion will destabilize. If branched polysiloxane is not required, the silane addition is avoided.

According to the present invention, an anionic emulsifier has an important role for simple and faster emulsion processing of high internal phase viscosity emulsions having particle size up to 150 nm. An anionic surfactant is selected from organic sulfonic acids. Most common sulfonic acids used in the present process are alkylaryl sulfonic acid; alkylaryl polyoxyethylene sulphonic acid; alkyl sulfonic acid; and alkyl polyoxyethylene sulfonic acid. Structures of sulfonic acids are as shown below:

$R^2C_6H_4SO_3H$          (V)

$R^2C_6H_4O(C_2H_4O)_mSO_3H$          (VI)

$R^2SO_3H$          (VII)

$R^2O(C_2H_4O)_mSO_3H$          (VIII)

Where $R^2$, which may differ, is a monovalent hydrocarbon radical having at least 6 carbon atoms. The most preferable $R^2$ groups, but not limited to the following groups, are hexyl, octyl, decyl, dodecyl, cetyl, stearyl, myristyl, and oleyl. 'm' is an integer from 1 to 25. The most preferable anionic surfactants used in the present inventions are octylbenzene sulfonic acid; dodecylbenzene sulfonic acid; cetylbenzene sulfonic acid; alpha-octyl sulfonic acid; alpha-dodecyl sulfonic acid; alpha-cetyl sulfonic acid; polyoxyethylene octylbenzene sulfonic acid; polyoxyethylene dodecylbenzene sulfonic acid; polyoxyethylene cetylbenzene sulfonic acid; polyoxyethylene octyl sulfonic acid; polyoxyethylene dodecyl sulfonic acid; and polyoxyethylene cetyl sulfonic acid. Generally, 1 to 15% anionic surfactant is used in the present emulsion process. Preferably, 3-10% anionic surfactant is used to obtain the optimum result. Anionic surfactant has a dual role in the present emulsion process. Anionic surfactant acts as a condensation/ring opening catalyst together with a surfactant for emulsion making. Thus, by using an anionic emulsifier, the process does not require any catalyst for polymer growth of organopolysiloxane during the emulsion process.

It is also observed according to the present invention, that at least one additional emulsifier together with an anionic emulsifier is essential along with the controlled temperature of emulsification and polymerization for making the emulsion in a simple and faster way. It is especially found, by way of the present invention, that at least one non-ionic emulsifier, in concert with anionic surfactant helps for faster and simpler emulsion production. Non-ionic emulsifiers having an HLB value of 10 to 19 are suitable to make the emulsion process simpler. The most useful surfactants of this category are polyoxyalkylene alkyl ether, polyoxyalkylene alkylphenyl ethers and polyoxyalkylene sorbitan esters. Some useful surfactants having an HLB value of 10 to 19 are polyethylene glycol octyl ether; polyethylene glycol lauryl ether; polyethylene glycol tridecyl ether; polyethylene glycol cetyl ether; polyethylene glycol stearyl ether; polyethylene glycol nonylphenyl ether; polyethylene glycol dodecylphenyl ether; polyethylene glycol cetylphenyl ether; polyethylene glycol stearylphenyl ether; polyethylene glycol sorbitan mono stearate; and polyethylene glycol sorbitan mono oleate. A non-ionic surfactant having the proper HLB value has great importance in the present invention to make process more simple.

Generally, 1 to 25% non ionic surfactant is used in the emulsion-processing process. Preferably, 5-20% non-ionic surfactant is used in the present emulsion to obtain the optimum result. It is well known in the art that surfactant(s) having an HLB value between 12 and 15 are useful to make organopolysiloxane emulsion by using standard homogenizer in a shorter time period and it is also well known to use a mixture of surfactants that has an HLB value of 12 to 15 to get an emulsion of organopolysiloxane having long stability.

According to the present invention, it is also important to provide selective formulation of the emulsifiers in a ratio such that the mixture has an HLB value of preferably 12 to 15 with at least one anionic surfactant and one non-ionic surfactant in the mixture.

An important aspect in the present emulsion process is the selective use of a mixture of surfactants, which not only make stable emulsions in a faster way by using a standard homogenizer, but also to produce a small particle size emulsion of up to 150 nm. Particle size of the emulsion is highly dependent on the ratio of anionic and non-ionic emulsifier(s) in the mixture having an HLB value of 12 to 15.

It is also well known in the art that polymer growth rate of the orgaopolyisiloxane is also highly dependent on the particle size of the emulsion. Thus, polymer growth rate of the organopolysiloxane during the emulsion process is much higher compared to organopolysiloxane emulsion having particle size larger than 150 nm.

According to the present invention, the temperature during the emulsion process has an important role in controlling the particle size of the emulsion, the particle size distribution (i.e polydispersibility: a value of 1 is poor and a value of 0.1 or less is very good), and the polymer growth rate of the organopolysiloxane during the emulsion process. It is also observed in the present emulsion process that particle size, distribution of the particles, and polymer viscosity become out of control if temperature is not maintained within a selective limit. It is found that a significant deviation of final emulsion specifications take place where temperature control is not within the selective range even though emulsion is produced by using an optimum combination of emulsifiers with a proper combination of fluid and emulsifier. Maintaining a temperature below 50° C. is useful to control the particle size, distribution of particles in the emulsion, and polymer growth rate of the organopolysiloxane in the emulsion.

Further, it is also important to control the emulsion temperature during the aging of the emulsion in case of ultra high molecular weight (more than 2 million cp) organopolysiloxane polymers in the emulsion. A temperature below 30° C. is useful to make the polymerization faster in the case of ultra-high molecular weight organopolysiloxane polymers required in the inner phase of the emulsion. Emulsion polymerization is significantly reduced if the temperature is more than 30° C. during the aging process, and it is very difficult to achieve ultra high viscosity at high temperature. Thus, it is clear that for faster completion of the emulsion process for high molecular weight organopolysiloxane polymer to ultra high molecular weight polymer emulsions by an emulsion polymerization process, temperature has a great role during the emulsion making process and during the aging process. Thus, according to the present process, a combination of mixed emulsifiers having an HLB value between 12 and 15 (containing at least one anionic emulsifier and at least one non-ionic emulsifier) together with temperature control during emulsion preparation and during aging, helps the emulsion process to produce useful emulsions below 150 nm particle size with a standard homogenizer.

The components are homogenized by standard homogenizers. A useful standard shear stirring system may be used such as a conventional single-stage stator-rotor homogenizer or other types of standard homogenizers which are used in the normal homogenizing process. Homogenizing can be carried out in batch or continuously depending on the design of emulsion process. From the capital investment point of view, it is also clear that the process needs an economical homogenizing system and avoids the use of the expensive ultra-high-pressure homogenizing system.

Importantly, it is found by way of the present invention that the emulsions obtained following the process of the invention are highly stable. In particular, tests revealed that when an emulsion obtained was put in the oven in the range of 45 to 60° C., and most preferably, 55° C., for one month, no creaming or separation or deformation in the emulsion was observed. A study of 12 hour freeze/thaw cycles in 10° C./50° C. temperature for one month also showed no creaming or separation or deformation in the emulsion.

The details of the invention, its objects and advantages are explained hereunder in greater detail in relation to non-limiting exemplary illustrations of the process:

EXAMPLES

Example I

In the emulsion process, 4.5 kg linear alkyl benzene sulfonic acid, 7 kg tridecyl alcohol ethoxylate having an HLB value 14, and 4.5 kg water were introduced into a 100 L mixing tank having a cold water jacket. The components were mixed for 5 minutes, then 31.22 kg Wacker PDM siloxane (a 40 cp alpha, omega-hydroxy terminated polydimethylsiloxane) were added and mixed by single stage stator-rotor homogenizer until the particle size dropped to 70 nm. Mixing was continued for 25 min to reach a particle size of 70 nm. During mixing, the temperature of the components was maintained below 30° C. Then, the emulsion was diluted with 30 kg water and the material maintained at temperature below 30° C., and thereafter neutralized with 85% triethanolamine. 4 ppm Kathon CG was added as a biocide. The total process was completed within one hour.

The polymer was separated by adding isopropanol in the emulsion in a 3:1 ratio of isopropanol to emulsion. The isopropanol layer was separated and the fluid layer washed three times with isopropanol. The polymer was dried in a vacuum oven. Viscosity of the polymer was 1,850,000 cp.

Emulsion particle size was measured by Malvern Zetasizer Nano-ZS. Result showed 70.3 nm particle size of the emulsion having 0.09 polydispersity.

Comparative Example IA

A milky white emulsion was prepared by following Example I except that the non-ionic surfactant was replaced by a linear alkyl benzene sulfonic acid. The temperature was maintained below 30° C. like Example I and total emulsification was completed within one hour. The emulsion was neutralized with 85% triethanolamine and 4 ppm Kathon CG was added.

The polymer was separated by adding isopropanol to the emulsion in a ratio 3:1 of isopropanol to emulsion. The isopropanol layer was separated and the fluid layer was washed three times with isopropanol. The polymer was dried in a vacuum oven. Viscosity of the polymer was 70,000 cp.

Emulsion particle size was measured by Malvern Zetasizer Nano-ZS. Result showed 168 nm particle size of the emulsion having 0.40 polydispersity.

The above reveals that due to the use of one emulsifier in the comparative example IA, it was not possible to reach the same particle like example I and the higher particle size emulsion in IA compared to I hindered polymer growth. Thus, after achieving a particle size of 168 nm, viscosity of the dimethylpolysiloxane was much less than example I. Also, the polydispersity in IA is higher compared to that of I.

Comparative Example IB

A milky white emulsion was prepared by following Example I except the non-ionic surfactant was replaced by linear alkyl benzene sulfonic acid and temperature was not controlled during the emulsification process. The temperature was increased to 55° C. during emulsification and the total emulsification process was completed within one hour. Finally, the emulsion was neutralized with 85% triethanolamine and 4 ppm Kathon CG was added.

The polymer was separated by adding isopropanol to the emulsion in a 3:1 ratio of isopropanol to emulsion. The isopropanol layer was separated and fluid layer washed three times with isopropanol. The polymer was dried in a vacuum oven. Viscosity of the polymer was 8,000 cp.

Emulsion particle size was measured by Malvern Zetasizer Nano-ZS. Result showed 185 nm particle size of the emulsion having 0.80 polydispersity.

Since temperature was not maintained during the emulsification process, it was not possible to achieve the same fluid viscosity and particle size as in IA.

Example IC

A milky white emulsion was prepared by following Example I except the temperature was not maintained within the selective range during the emulsification process. The temperature was increased to 55° C. during emulsification and total emulsification was completed within one hour. Finally, the emulsion was neutralized with 85% triethanol amine and 4 ppm Kathon CG was added.

The polymer was separated by adding isopropanol to the emulsion in a 3:1 ratio of isopropanol to emulsion. The isopropanol layer was separated and the fluid layer was washed three times with isopropanol. The polymer was dried in a vacuum oven. Viscosity of the polymer was 80,000 cp.

Emulsion particle size was measured by Malvern Zetasizer Nano-ZS. Result showed 125 nm particle size of the emulsion having 0.80 polydispersity.

Since temperature was not maintained during the emulsification process, it was not possible to achieve the same fluid viscosity and particle size as in I.

Example II

In the emulsion process, 3.0 kg linear alkyl benzene sulfonic acid, 3 kg tridecyl alcohol ethoxylate having HLB value 14, and 4.5 kg water was transferred to a 100 L mixing tank having a cold water jacket. The components were mixed for 5 min. 31.22 kg Wacker PDM siloxane (a 40 cp alpha omega, hydroxyl-terminated polydimethyl siloxane) was added and the composition mixed in a single stage stator-rotor homogenizer until the particle size dropped to 117 nm. Mixing was continued for 25 min to reach a particle size 117 nm. During mixing, temperature of the components was maintained below 30° C. 0.22 kg methyl triethoxysilane was added and mixing continued for 10 min. Then, the emulsion was diluted with 31 kg water and the material temperature below 30° C. The emulsion was neutralized with 85% triethanolamine and 4 ppm Kathon CG was added as a biocide. The total process was completed within one hour.

The polymer was separated by adding isopropanol to the emulsion in a 3:1 ratio of isopropanol to emulsion. The isopropanol layer was separated and the fluid layer washed three times with isopropanol. The polymer was dried in a vacuum oven. Viscosity of the polymer was 8,260,000 cp.

Emulsion particle size was measured by Malvern Zetasizer Nano-ZS. Result showed 116 nm particle size of the emulsion having 0.03 polydispersity.

Comparative Example IIA

A milky white emulsion was prepared by following Example II except the non-ionic surfactant was replaced by linear alkyl benzene sulfonic acid. The temperature was maintained below 30° C. like example II and total emulsification completed within one hour. Finally, the emulsion was neutralized with 85% triethanolamine and 4 ppm Kathon CG was added.

The polymer was separated by adding isopropanol to the emulsion in a 3:1 ratio of isopropanol to emulsion. The isopropanol layer was separated and the fluid layer washed three times with isopropanol. The polymer was dried in a vacuum oven. Viscosity of the polymer was 1,960,000 cp.

Emulsion particle size was measured by Malvern Zetasizer Nano-ZS. Result showed 185 nm particle size of the emulsion having 0.40 polydispersity.

Since under this example (comparative example IIA) only one emulsifier was used, it was not possible to reach the same particle like example II, and the higher particle size emulsion in IIA, compared to II, hindered polymer growth. Thus, after achieving a particle size of 185 nm, viscosity of the dimethylpolysiloxane was much less than that of example II.

Comparative Example IIB

A milky white emulsion was prepared by following Example II except the non-ionic surfactant was replaced by linear alkyl benzene sulfonic acid and the temperature was not maintained as per the proposed selective range of the invention during the emulsification process. The temperature was increased to 55° C. during the emulsification and total emulsification was completed within one hour. Finally, the emulsion was neutralized with 85% triethanolamine and 4 ppm Kathon CG was added.

The polymer was separated by adding isopropanol to the emulsion in a 3:1 ratio of isopropanol to emulsion. The isopropanol layer was separated and the fluid layer washed three times with isopropanol. The polymer was dried in a vacuum oven. Viscosity of the polymer was 87,000 cp.

Emulsion particle size was measured by Malvern Zetasizer Nano-ZS. Result showed 235 nm particle size of the emulsion having 0.70 polydispersity.

Since the temperature was not maintained during the emulsification process, it was not possible to achieve the same fluid viscosity and particle size as in IIA.

Example IIC

A milky white emulsion was prepared as in Example II except that the temperature was not maintained in the selective range as proposed under the invention during the emulsification process. The temperature was increased to 55° C. during the emulsification process and total emulsification was completed within one hour. Finally the emulsion was neutralized with 85% triethanolamine and 4 ppm Kathon CG was added.

The polymer was separated by adding isopropanol to the emulsion in a 3:1 ratio of isopropanol to emulsion. The isopropanol layer was separated and the fluid layer washed three times with isopropanol. The polymer was dried in a vacuum drier. Viscosity of the polymer was 1,800,000 cp.

Emulsion particle size was measured by Malvern Zetasizer Nano-ZS. Result showed 140 nm particle size of the emulsion having 0.80 polydispersity.

Since the temperature was not maintained during the emulsification process, it was not possible to achieve the same fluid viscosity and particle size as in II.

Example III

In the emulsion process, 4.0 kg linear alkyl benzene sulfonic acid, 7 kg tridecyl alcohol ethoxylate having HLB value 14, and 4.5 kg water was transferred to a 100 L mixing tank having a cold water jacket. The components were mixed for 5 min. 31.22 Kg Wacker PDM siloxane was added (a 40 cp alpha omega hydroxyl-terminated polydimethyl siloxane) and the components mixed by a single stage stator-rotor homogenizer until the particle size dropped to 117 nm. Mixing was continued for 25 min to reach the particle size 117 nm. During mixing, the temperature of the components was maintained below 30° C. 0.22 g tetraethylorthosilicate was added and mixing was continued for 10 min. Then, the emulsion was diluted with 31 kg water and the material temperature was maintained below 30° C. Then, the emulsion was kept for 5 hours below 25° C. The emulsion was neutralized with 85% triethanolamine after 5 hr aging, and 4 ppm Kathon CG was added as a biocide. The total process including aging was completed within six hours.

The polymer was separated by adding isopropanol to the emulsion in a 3:1 ratio of isopropanol to emulsion. The isopropanol layer was separated and the fluid layer washed three times with isopropanol. The polymer was dried in a vacuum oven. Viscosity of the polymer was 45,260,000 cp.

Emulsion particle size was measured by Malvern Zetasizer Nano-ZS. Result showed 117 nm particle size of the emulsion having 0.09 polydispersity.

Comparative Example IIIA

A milky white emulsion was prepared by following Example III except the non-ionic surfactant was replaced by a mixture of 5.5 kg linear alkyl benzene sulfonic acid and 5.5 kg sodium lauryl sulphate. The temperature was maintained below 30° C. like example III. Then, the emulsion was kept for 5 hours below 25° C. The emulsion was neutralized with 85% triethanolamine after 5 hr aging and 4 ppm Kathon CG was added as a biocide. The total process including aging was completed within six hours.

The polymer was separated by adding isopropanol to the emulsion in a ratio 3:1 of isopropanol to emulsion. The isopropanol layer was separated and the fluid layer washed three times with isopropanol. The polymer was dried in a vacuum oven. Viscosity of the polymer was 7,500,000 cp.

Emulsion particle size was measured by Malvern Zetasizer Nano-ZS. Result showed 170 nm particle size of the emulsion having 0.50 polydispersity.

Since under this comparative example IIIA two anionic emulsifiers were used, it was not possible to reach the same particle size like example III, and the higher particle size emulsion in IIIA compared to III hindered polymer growth. Thus, after achieving a particle size of 170 nm, viscosity of the dimethylpolysiloxane was much less than that of example III.

Comparative Example IIIB

A milky white emulsion was prepared as in Example III except the non-ionic surfactant was replaced by linear alkyl benzene sulfonic acid and the temperature was not maintained during the emulsification process. The temperature was increased to 55° C. during emulsification. Then, the emulsion was kept for 5 hours at 40-45° C. The emulsion was neutralized with 85% triethanolamine after 5 hr aging, and 4 ppm Kathon CG was added as a biocide. The total process including aging was completed within six hours.

The polymer was separated by adding isopropanol to the emulsion in a 3:1 ratio of isopropanol to emulsion. The isopropanol layer was separated and the fluid layer washed three times with isopropanol. The polymer was dried in a vacuum oven. Viscosity of the polymer was 1,500,000 cp.

Emulsion particle size was measured by Malvern Zetasizer Nano-ZS. Result showed 230 nm particle size of the emulsion having 0.78 polydispersity.

Since the temperature was not maintained during the emulsification process, it was not possible to achieve the same fluid viscosity and particle size as in IIIA.

Example IIIC

A milky white emulsion was prepared by following Example III except the temperature was not maintained within the selective range during the emulsification process. Temperature was increased to 55° C. during emulsification process. Then, the emulsion was kept for 5 hr at 40-45° C. The emulsion was neutralized with 85% triethanolamine after 5 hours aging, and 4 ppm Kathon CG was added as a biocide. The total process including aging was completed within six hours.

The polymer was separated by adding isopropanol to the emulsion in a 3:1 ratio of isopropanol to emulsion. The isopropanol layer was separated and the fluid layer washed three times with isopropanol. The polymer was dried in a vacuum oven. Viscosity of the polymer was 9,730,000 cp.

Emulsion particle size was measured by Malvern Zetasizer Nano-ZS. Result showed 138 nm particle size of the emulsion having 0.80 polydispersity.

Since the temperature was not maintained during the emulsification process, it was not possible to achieve the same fluid viscosity and particle size as in III.

Example IV

In the emulsion process, 4.5 kg linear alkyl benzene sulfonic acid, 7 kg tridecyl alcohol ethoxylate having HLB value 14, and 4.5 kg water were transferred to a 100 L mixing tank having a cold water jacket. The components were mixed for 5 min. 31.22 kg decamethylcyclopentasiloxane were added and mixed by a single stage stator-rotor homogenizer until the particle size dropped to 70 nm. Mixing was continued for 25 min to reach the particle size 70 nm. During mixing, the temperature of the components was maintained below 30° C. Then, the emulsion was diluted with 30 kg water and the temperature was maintained below 30° C. The emulsion was neutralized with 85% triethanolamine and 4 ppm Kathon CG was added as a biocide. The total process was completed within one hour.

The polymer was separated by adding isopropanol to the emulsion in a 3:1 ratio of isopropanol to emulsion. The isopropanol layer was separated and the fluid layer washed three times with isopropanol. The polymer was dried in a vacuum oven. Viscosity of the polymer was found to be 1,050,000 cp.

Emulsion particle size was measured by Malvern Zetasizer Nano-ZS. Result showed 90.5 nm particle size of the emulsion having 0.08 polydispersity.

Comparative Example IV A

A milky white emulsion was prepared by following Example IV except the non-ionic surfactant was replaced by linear alkyl benzene sulfonic acid. The temperature was maintained below 30° C. like example IV and total emulsification was completed within one hour. Finally, the emulsion was neutralized with 85% triethanolamine and 4 ppm Kathon CG was added.

The polymer was separated by adding isopropanol to the emulsion in a 3:1 ratio of isopropanol to emulsion. The isopropanol layer was separated and the fluid layer washed three times with isopropanol. The polymer was dried in a vacuum oven. Viscosity of the polymer was found 24,500 cp.

Emulsion particle size was measured by Malvern Zetasizer Nano-ZS. Result showed 180 nm particle size of the emulsion having 0.30 polydispersity.

Since under this comparative example IV A only one emulsifier was used, it was not possible to reach the same particle size like example IV, and the higher particle size emulsion in IV A compared to IV hindered polymer growth. Thus, after achieving a particle size of 180 nm, viscosity of the dimethylpolysiloxane was much less than that of example IV.

Comparative Example IVB

A milky white emulsion was prepared by following Example IV except the non-ionic surfactant was replaced by linear alkyl benzene sulfonic acid and the temperature was not maintained within the selected range under the invention during the emulsification process. The temperature was increased to 55° C. during the emulsification process and total emulsification was completed within one hour. Finally, the emulsion was neutralized with 85% triethanolamine and 4 ppm Kathon CG was added.

The polymer was separated by adding isopropanol to the emulsion in a 3:1 ratio of isopropanol to emulsion. The isopropanol layer was separated and the fluid layer washed three times with isopropanol. The polymer was dried in a vacuum oven. Viscosity of the polymer was found 6,000 cp.

Emulsion particle size was measured by Malvern Zetasizer Nano-ZS. Result showed 185 nm particle size of the emulsion having 0.80 polydispersity.

Since the temperature was not maintained during the emulsification process, we were not able to achieve the same fluid viscosity and particle size as in IV A.

Example IV C

A milky white emulsion was prepared by following Example IV except the temperature was not maintained as per the selective range proposed under the invention during the emulsification process. The temperature was increased to 55° C. during emulsification and total emulsification was completed within one hour. Finally, the emulsion was neutralized with 85% triethanolamine and 4 ppm Kathon CG was added.

The polymer was separated by adding isopropanol to the emulsion in a 3:1 ratio of isopropanol to emulsion. The isopropanol layer was separated and the fluid layer washed three times with isopropanol. The polymer was dried in a vacuum oven. Viscosity of the polymer was found 7,000 cp.

Emulsion particle size was measured by Malvern Zetasizer Nano-ZS. Result showed 148.5 nm particle size of the emulsion having 0.80 polydispersity.

Since the temperature was not maintained during the emulsification process, it was not possible to achieve the same fluid viscosity and particle size as in IV.

The above results clearly demonstrate the findings under the invention that production of organopolysiloxane emulsions having particle size below 150 nm is only possible using a simple single stage stator-rotor homogenizer when the emulsifier mixture comprises at least one anionic emulsifier and at least one non-ionic emulsifier. Anionic emulsifiers or a mixture of anionic emulsifiers can not produce an organopolysiloxane emulsion below 150 nm by using simple homogenizer. According to the present invention, it is also clearly understood that temperature control during the emulsion process has an important role in controlling the particle size, the polydispersity of the emulsion particles, and the polymer growth rate. It is also observed in the examples that when the same formulation is followed without controlling the temperature, the emulsion produced in the process was worse in comparison to the emulsion produced with same formulation when the temperature is controlled during the emulsion process. It is observed that low aging temperatures for ultra-high molecular weight polymers also enhances the polymer growth rate in comparison to aging at higher temperatures. Also, the above results further demonstrate that a particle size below 150 nm has a substantial influence on faster organopolysiloxane polymer growth in comparison to silicone emulsion having particle size more than 150 nm.

The invention claimed is:

1. A process for the manufacture of a stable aqueous organopolysiloxane emulsion having a particle size (D50 value) up to 150 nanometers, comprising:

i) providing a formulation comprising (a) an organopolysiloxane of the formula I:

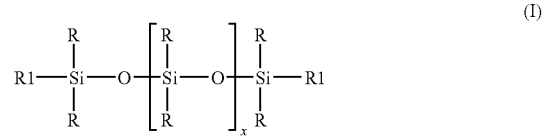

(I)

where R1 is hydroxyl group or a $C_{1-8}$ alkoxy group, and where R, which are the same or different, are monovalent hydrocarbon radicals, and x is an integer from 1 to 100 or mixtures thereof in an amount of 20 to 80% by. wt. (b) water in an amount of 5 to 30% by wt. (c) non-ionic emulsifier(s) having an HLB in the range of 10-19 in amounts of 1 to 25% by wt. and (d) at least one anionic emulsifier selected from organic sulfonic acids having an HLB in the range of 8-19 in an amount of 1 to 15% by. wt.;

ii) homogenizing the formulation of (i) while maintaining a temperature in the range of 10°C to 40°C so as to increase organopolysiloane polymer growth rate or rise in polymer viscosity to at least 20,000 mPa-s, and iii) neutralising the emulsion by alkali to a pH range of 6-8.

2. The process of claim 1 wherein the emulsifier or mixture of emulsifiers have an HLB value in the range of 12-15.

3. The process of claim 1 comprising:

(i) providing 8 to 30% of mixed emulsifiers comprising at least one anionic emulsifier selected from the group consisting of organic sulfonic acids and at least one non-ionic emulsifier having an HLB value in the range of 10-19;

(ii) homogenising the formulation while maintaining a temperature in the range of 20°C to 40°C, for a period of 10 minutes to 2 hr;

(iii) allowing the emulsion to age in the range of 5 to 30° C. wherein the viscosity of an internal phase oil increases to at least 20,000 mPa-s;

(iv) neutralising the emulsion with alkali, and adding biocide.

4. The process of claim 1, wherein for an internal oil viscosity of less than 500,000 cps, neutralizing of the emulsion is carried out immediately after completion of mixing.

5. The process of claim 1, wherein the organopolysiloxane of the formula (I) is selected from the group consisting of alpha, omega hydroxyl-terminated organopolysiloxanes; alpha, omega alkoxy-terminated organopolysiloxanes; and mixtures thereof.

6. The process of claim 1, wherein a branched polysiloxane emulsion is formed, comprising adding a tri-functional or tetra-functional silane or mixture thereof with the organopolysiloxane(s).

7. The process of claim 1, wherein the anionic surfactant is selected from the group consisting of alkylaryl sulfonic acid; alkylaryl polyoxyethylene sulphonic acid; alkyl sulfonic acid, alkyl polyoxyethylene sulfonic acid, and mixtures thereof.

8. The process of claim 7, wherein the sulfonic acids comprise:

$$R^2C_6H_4SO_3H \quad (V)$$

$$R^2C_6H_4O(C_2H_4O)_mSO_3H \quad (VI)$$

$$R^2SO_3H \quad (VII)$$

$$R^2O(C_2H_4O)_mSO_3H \quad (VIII)$$

where $R^2$ each individually is a monovalent hydrocarbon radical having at least 6 carbon atoms, and m is an integer from 1 to 25.

9. The process of claim 8, where $R^2$ individually are selected from the group consisting of hexyl, octyl, decyl, dodecyl, cetyl, stearyl, myristyl, and oleyl.

10. The process of claim 1, wherein the anionic surfactant (s) is used in amounts of 1-15% and are selected from the group consisting of octyl benzene sulfonic acid; dodecylbenzene sulfonic acid; cetylbenzene sulfonic acid; alpha-octyl sulfonic acid; alpha-dodecyl sulfonic acid; alpha-cetyl sulfonic acid; polyoxyethylene octyl-benzene sulfonic acid; polyoxyethylene-dodecyl benzene sulfonic acid; polyoxyethylene cetyl-benzene sulfonic acid; polyoxyethylene octyl sulfonic acid; polyoxyethylene dodecyl sulfonic acid, polyoxyethylene cetyl sulfonic acid, and mixtures thereof.

11. The process of claim 1, wherein said non-ionic emulsifiers comprise non-ionic surfactants in an amount of 1 to 25%, selected from the group consisting of polyoxyalkylene alkyl ethers, polyoxyalkylene alkylphenyl ethers, and polyoxyalkylene sorbitan esters.

12. The process of claim 11, wherein the nonionic emulsifier is selected from the group consisting of polyethylene glycol octyl ether; polyethylene glycol lauryl ether; polyethylene glycol tridecyl ether; polyethylene glycol cetyl ether; polyethylene glycol stearyl ether; polyethylene glycol nonylphenyl ether; polyethylene glycol dodecylphenyl ether; polyethylene glycol cetylphenyl ether; polyethylene glycol staerylphenyl ether; polyethylene glycol sorbitan mono stearate, polyethylene glycol sorbitan mono oleate, and mixtures thereof.

* * * * *